United States Patent [19]

Gill

[11] Patent Number: 5,666,248
[45] Date of Patent: Sep. 9, 1997

[54] MAGNETIZATIONS OF PINNED AND FREE LAYERS OF A SPIN VALVE SENSOR SET BY SENSE CURRENT FIELDS

[75] Inventor: Hardayal Singh Gill, Portola Valley, Calif.

[73] Assignee: International Business Machines Corporation, Armonk, N.Y.

[21] Appl. No.: 713,623

[22] Filed: Sep. 13, 1996

[51] Int. Cl.[6] ............................................. G11B 5/39
[52] U.S. Cl. ........................................................ 360/113
[58] Field of Search ............................... 360/113, 125, 360/126; 338/32 R; 324/252; 428/611

[56] References Cited

U.S. PATENT DOCUMENTS

| | | | |
|---|---|---|---|
| 4,816,948 | 3/1989 | Kamo et al. | 360/113 |
| 4,833,560 | 5/1989 | Doyle | 360/113 |
| 4,949,039 | 8/1990 | Grunberg | 324/252 |
| 5,243,316 | 9/1993 | Sakakima et al. | 338/32 |
| 5,301,079 | 4/1994 | Cain et al. | 360/113 |
| 5,341,118 | 8/1994 | Parkin et al. | 338/32 |
| 5,408,377 | 4/1995 | Gurney et al. | 360/113 |
| 5,442,508 | 8/1995 | Smith | 360/113 |
| 5,446,613 | 8/1995 | Rottmayer | 360/113 |
| 5,452,163 | 9/1995 | Coffey et al. | 360/113 |
| 5,493,467 | 2/1996 | Cain et al. | 360/113 |
| 5,549,978 | 8/1996 | Iwasaki et al. | 428/692 |
| 5,581,427 | 12/1996 | Ferg et al. | 360/113 |
| 5,585,986 | 12/1996 | Parkin | 360/113 |
| 5,591,532 | 1/1997 | Berkowitz | 428/611 |
| 5,595,830 | 1/1997 | Daughton | 428/611 |

FOREIGN PATENT DOCUMENTS

WO94/11889   5/1994   WIPO.

OTHER PUBLICATIONS

Dupas et al., Very large magnetoresistance effects induced by antiparallel magnetization in two ultrathin cobalt films, J. Appl. Phys. vol. 67, No. 9, 1 May 1990, pp. 5680–5682.

Parkin et al., Dramatic enhancement of interlayer exchange coupling and giant magnetoresistance in $Ni_{81}Fe_{19}/Cu$ multilayers by addition of thin Co interface layers, Appl. Phys. Lett. vol. 61, No. 11, 14 Sep. 1992, pp. 1358–1360.

Daughton, Weakly Coupled GMR Sandwiches, 1994, IEEE Trans. on Magnetics, vol. 30, No. 2, pp. 364–368.

(List continued on next page.)

*Primary Examiner*—Jefferson Evans
*Attorney, Agent, or Firm*—Baker, Maxham, Jester & Meador

[57] ABSTRACT

A self-biasing magnetoresistive (MR) spin valve sensor is provided which does not require an antiferromagnetic layer for orienting magnetizations. A non-magnetic electrically-conducting spacer layer is sandwiched between ferromagnetic free and pinned layers. First and second leads are connected to the spin valve sensor for conducting a sense current therethrough. Because of a magnetic coupling between the free and pinned layers, there are ferromagnetic coupling fields $H_{FC}$ in the free and pinned layers which are parallel with respect to one another and are directed in a first direction when the sense current is conducted. When the sense current is conducted there is also a stray demagnetization field $H_{DEMAG}$ which is induced into the free layer from the pinned layer. A first flux guide is magnetically coupled to first edges of the layers at the ABS and a second flux guide is magnetically coupled to second edges of the free layer recessed from the ABS so that the effect of the demagnetization field $H_{DEMAG}$ on the free layer is at least minimized and preferably zero. The sense current is directed through the spin valve sensor so that the sense current field from the pinned layer balances the ferromagnetic coupling on the free layer and the sense current field from the free layer adds to the ferromagnetic coupling on the pinned layer. Accordingly, the magnetic moment of the free layer is free to rotate as influenced by field signals from the rotating magnetic disk and the magnetic moment of the pinned layer is pinned in a pre-selected direction perpendicular to the ABS.

25 Claims, 10 Drawing Sheets

OTHER PUBLICATIONS

Heim et al., Design and Operation of Spin Valve Sensors, 1994, IEEE Trans. on Magnetics, vol. 30, No. 2, pp. 316–321.

Beech et al., Current Distribution in Spin–Valve Structures, 1994, IEEE Trans. on Magnetics, vol. 30, No. 6, pp. 4557–4559.

Smith et al., GMR Multilayers and Head Design for Ultra-high Density Magnetic Recording, 1996, IEEE Trans. on Magnetics, vol. 32, No. 1, pp. 135–141.

MAGNETIZATIONS OF PINNED AND FREE LAYERS OF A SPIN VALVE SENSOR SET BY SENSE CURRENT FIELDS

BACKGROUND OF THE INVENTION

1. Field of the Invention

The present invention relates to a self-biasing magnetoresistive spin valve sensor that does not require an antiferromagnetic layer for pinning the magnetization of a pinned layer, but, in contrast, employs fields from the sense current to pin the magnetization of the pinned layer and unbias the magnetization of the free layer.

2. Description of the Related Art

A spin valve sensor is a type of magnetoresistive (MR) sensor that is employed by a read head for sensing magnetic fields on a moving magnetic medium, such as a magnetic disk or a magnetic tape. A spin valve sensor includes a non-magnetic conductive layer, hereinafter referred to as a spacer layer, that is sandwiched between first and second ferromagnetic layers. The first ferromagnetic layer is also referred to as a "pinned layer" and the second ferromagnetic layer is also called a "free layer". First and second leads are connected to the spin valve sensor for conducting a sense current therethrough. The magnetization of the first ferromagnetic layer is pinned 90° to the magnetization of the second ferromagnetic layer, and the magnetization of the second ferromagnetic layer is free to respond to external magnetic fields. The thickness of the spacer layer is chosen to be less than the mean free path of conduction of electrons through the sensor. With this arrangement, some of the conduction electrons are scattered by the interfaces that the spacer layer shares with the pinned and free layers. When the magnetizations of the pinned and free layers are parallel with respect to one another, scattering is minimal. Scattering is highest when the magnetizations of the pinned and free layers are antiparallel. The amount of scattering changes the resistance of the spin valve sensor proportional to cos θ, where θ is the angle between the magnetizations of the pinned and free layers. A spin valve sensor has a significantly higher magnetoresistive (MR) coefficient than an anisotropic magnetoresistive (AMR) sensor. For this reason it is sometimes referred to as a giant magnetoresistive (GMR) sensor.

A spin valve read head is typically combined with an inductive write head to form a combined head. The combined head may have the structure of either a merged head, or a piggyback head. In a merged head the second shield serves as a shield for the read head and as a first pole piece for the write head. A piggyback head has a separate layer which serves as the first pole piece for the write head. In a magnetic disk drive an air bearing surface (ABS) of the combined head is supported adjacent a rotating disk to write information on or read information from the disk. Information is written to the rotating disk by magnetic fields which fringe across a gap between the first and second pole pieces of the write head. In a read mode, the resistance of the spin valve sensor changes proportionally to the magnitudes of the magnetic fields from the rotating disk. When the sense current is conducted through the spin valve sensor the resistance changes cause potential changes that are detected and processed as playback signals.

The magnetization of the first ferromagnetic layer is typically pinned by exchange coupling with an antiferromagnetic layer. The antiferromagnetic layer may be constructed from a group of materials which include FeMn, NiMn and NiO. The blocking temperatures of these materials falls in a range from 160° to 200°. Blocking temperature is the temperature at which the magnetic spins within a material lose their orientation. When the blocking temperature of the antiferromagnetic material is exceeded the spins of the antiferromagnetic layer lose their orientation causing the first ferromagnetic layer to no longer be pinned. Unfortunately, the aforementioned blocking temperatures can be easily exceeded by electrostatic discharge (ESD) or electrostatic overstress (EOS) during fabrication, testing or operation in a disk drive. ESD can ruin the spin valve sensor, while EOS can reduce its efficiency. Another problem with the prior art antiferromagnetic layer is that it shunts a portion of the sense current thereby reducing the efficiency of the sensor.

SUMMARY OF THE INVENTION

This invention provides a magnetoresistive (MR) spin valve sensor which does not have an antiferromagnetic layer. The spin valve sensor relies upon fields from the sense current to pin the first ferromagnetic layer and to unbias the magnetization of the second ferromagnetic layer. The fields come from the sense current conducted through the pinned and free layers. The portion of the sense current conducted through the pinned layer and spacer layer induces a sense current field on the free layer and the portion of the sense current conducted through the free layer and spacer layer induces a sense current field on the pinned layer. Accordingly, the present invention provides a self-biasing MR spin valve sensor. This scheme will not work, however, without first taking care of a strong demagnetization field induced on the free layer by the pinned layer. The demagnetization field on the free layer from the pinned layer is on the order of 51 Oe when the sensor is centered between first and second shield layers. A typical sense current for a spin valve sensor is 6 mA which can produce a sense current field of 10–12 Oe. Accordingly, the sense current field is not strong enough to balance the demagnetization field induced on the free layer.

The present invention employs first and second flux guides adjacent first and second edges of the spin valve layers, these edges being parallel to the ABS. Accordingly, the first flux guide will form a portion of the ABS, the spin valve sensor is on top of the first flux guide and the second flux guide is on top of the spin valve sensor. The flux guides reduce the magnetic pole strength at the bottom (ABS) and top edges of the pinned layer, thereby reducing the demagnetizing field produced by it to near zero. The only other fields that have to be dealt with are ferromagnetic coupling fields between the pinned and free layers. This field is on the order of 10–12 Oe which is conveniently comparable to the field from the sense current. Accordingly, by selecting the direction of the sense current, the sense current field from the free layer will add to the ferromagnetic coupling field of the pinned layer to pin the pinned layer, and the sense current field from the pinned layer will counterbalance the ferromagnetic field on the free layer so that it is free to rotate under the influence of field signals from a rotating disk. The present invention employs various schemes for obtaining the desired result, such as varying the thicknesses of the pinned, spacer and free layers and selecting the amount of sense current.

An object of the present invention is to provide a self-biasing spin valve sensor which obviates the need for an antiferromagnetic layer for pinning the magnetic moment of the pinned layer.

Another object is to provide a self-biasing spin valve sensor which employs the fields from the sense current to establish the orientation of the magnetizations of the pinned layer and the free layer.

A further object is to provide a self-biasing spin valve sensor which has increased sensitivity because of minimal shunting of the sense current.

Other objects and attendant advantages of the present invention will become apparent upon reading the following description taken together with the accompanying drawings.

DESCRIPTION OF THE PREFERRED EMBODIMENTS

Figures 1, 2:
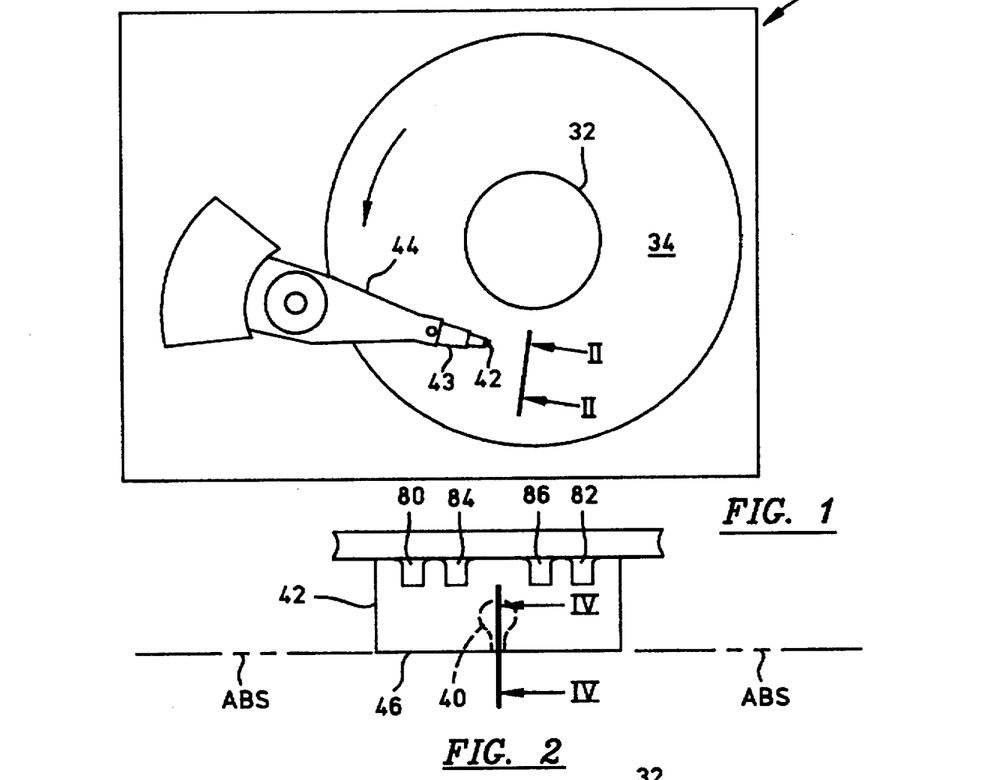
FIG. 1 is a planar illustration of a magnetic disk drive.
FIG. 2 is a view taken along plane II—II of FIG. 1.
Figure 3:
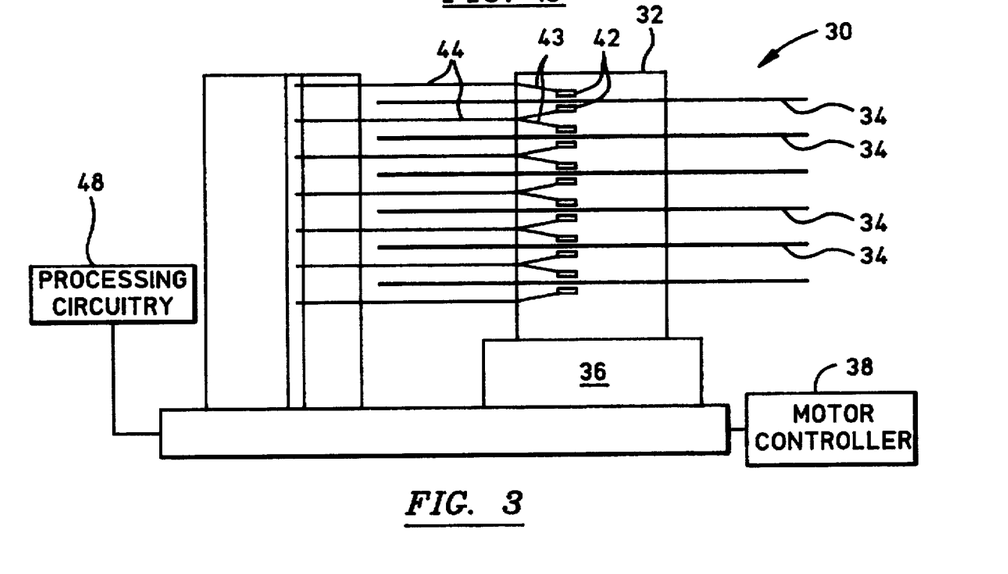
FIG. 3 is an elevation view of the magnetic disk drive of FIG. 1.

Referring now to the drawings wherein like reference numerals designate like or similar parts throughout the several views there is illustrated in FIGS. 1, 2 and 3 a magnetic disk drive 30. The drive 30 includes a spindle 32 which supports and rotates a magnetic disk 34. The spindle 32 is rotated by a motor 36 which in turn is controlled by motor controller 38. A magnetic head 40, which may be a merged MR head for recording and reading, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.075 μm) cushion of air (air bearing) by the air bearing surface (ABS) 46. The magnetic head 40 is then employed for writing information to multiple circular tracks on the surface of the disk as well as for reading information therefrom. Processing circuitry 48 exchanges signals representing said information with the head 40, providing motor drive signals, and providing control signals for moving the slider to various tracks.

Figure 4:
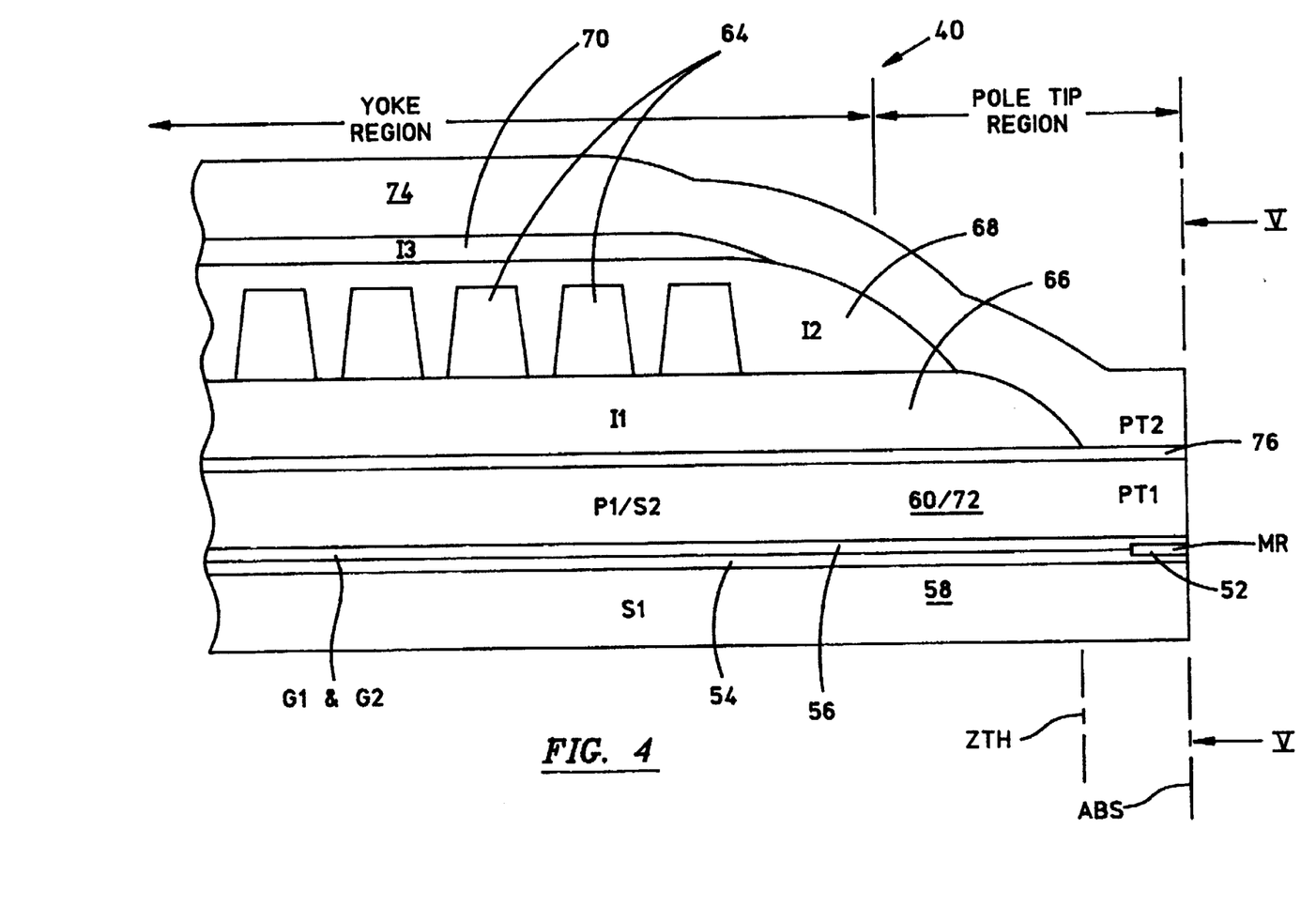
FIG. 4 is a view taken along plane IV—IV of FIG. 2.

FIG. 4 is a side cross-sectional elevation view of a merged MR head 50 which has a write head portion and a read head portion, the read head portion employing a spin valve MR sensor 52 of the present invention. The MR sensor 52 is sandwiched between the first and second gap layers 54 and 56, the first and second gap layers, in turn, being sandwiched between first and second shield layers 58 and 60. In response to external magnetic fields, the resistance of the MR sensor 52 changes. A sense current conducted through the sensor causes these changes to be manifested as potential changes. These potential changes are processed by the processing circuitry 48 shown in FIG. 3.

The write head portion of the head includes a coil layer 64 which is sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap (not shown) which is spaced from the ABS. As shown in FIG. 2 first and second solder connections 80 and 82 connect leads (not shown) from the MR sensor 52 to leads (not shown) on the suspension 43 and third and fourth solder connections 84 and 86 connect leads (not shown) from the coil 64 to leads (not shown) on the suspension.

Figure 5:
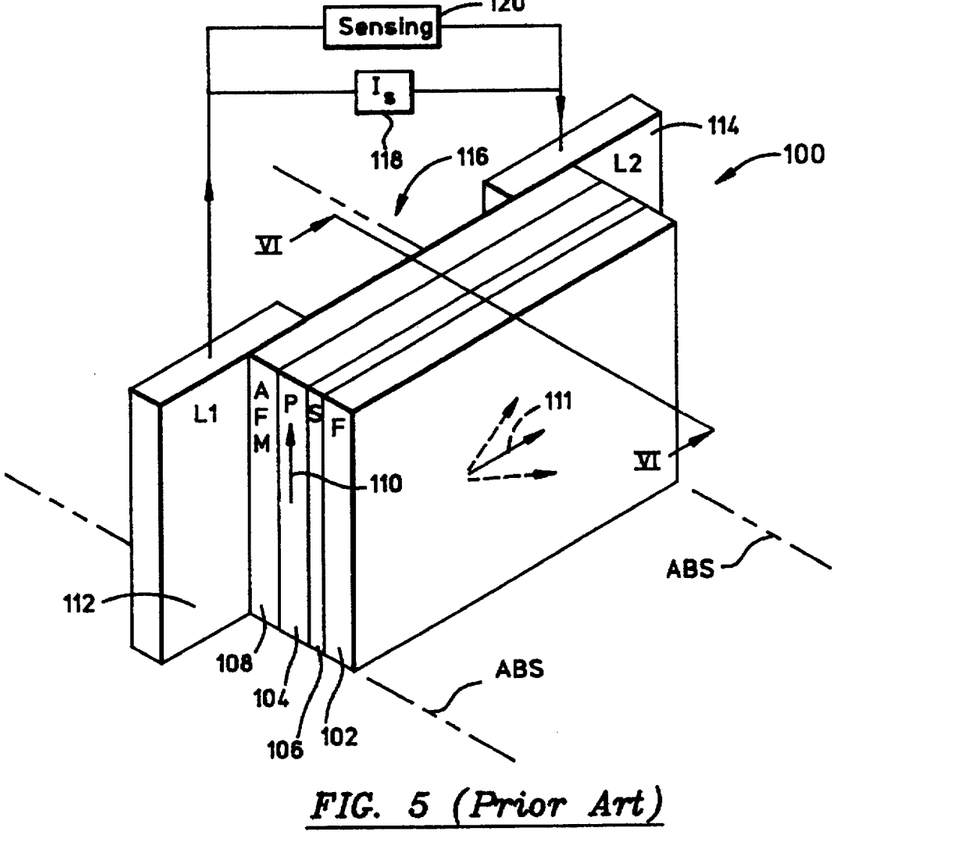
FIG. 5 is an isometric illustration of a prior art spin valve sensor.

FIG. 5 is a prior art embodiment 100 of a magnetoresistive (MR) spin valve sensor which has first and second ferromagnetic layers which are a free layer 102 and a pinned layer 104. A non-magnetic electrically-conducting spacer layer 106 is sandwiched between the free layer 102 and the pinned layer 104. An antiferromagnetic (AFM) layer 108 has a film surface which interfaces a film surface of the pinned layer 104 so that the magnetization 110 of the pinned layer 104 is pinned in a predetermined direction, such as perpendicular to the ABS, by exchange coupling with the antiferromagnetic layer 108. The free layer 102 has a magnetization 111 which is free to rotate under the influence of field signals from the rotating disk. The free and pinned layers 102 and 104 are typically made of Permalloy (NiFe) and the spacer layer 106 is typically made of copper. The anti-ferromagnetic layer 108 may be made of a material selected from the group of NiMn and FeMn. First and second leads 112 and 114 are electrically connected to the sensor 100 with a space 116 therebetween which defines the active region of the MR sensor as well as the track width of the read head employing the spin valve sensor. A sense current source 118 is electrically connected to the first and second leads 112 and 114 for providing a sense current ($I_s$) which is conducted through the spin valve sensor. In parallel with the sense current source 118 is a sensing circuit 120 for sensing potential changes across the spin valve sensor 100 when field signals are induced into the spin valve sensor by the rotating disk 34 shown in FIG. 1. The sense current source 118 and the sensing circuit 120 are part of the processing circuitry 48 in FIG. 3.

Each of the layers 102, 104, 106 and 108 conduct a portion of the sense current between the first and second leads 112 and 114. A key parameter in the operation of a spin valve sensor is that the spacer layer 106 have a thickness which is less than the mean free path of conduction electrons flowing between the first and second leads 112 and 114. The degree of electron scattering, which depends upon the relative angle between the magnetization 111 of the free layer 102 and the magnetization 110 of the pinned layer 104, determines the resistance of the MR sensor to the sense current $I_s$. The greatest scattering and the corresponding greatest increase in resistance occurs when the magnetizations 110 and 111 are antiparallel and the least scattering and the corresponding least resistance change occurs when the magnetizations 110 and 111 are parallel with respect to one another. The magnetization 111 of the free layer 102 is typically oriented parallel to the ABS so that upon receiving positive and negative field signals from a rotating disk the magnetization 111 rotates upwardly or downwardly to decrease or increase the resistance of the sensor. This would be an opposite situation if the magnetization 110 of the pinned layer 104 was oriented downwardly instead of upwardly.

Figure 6:
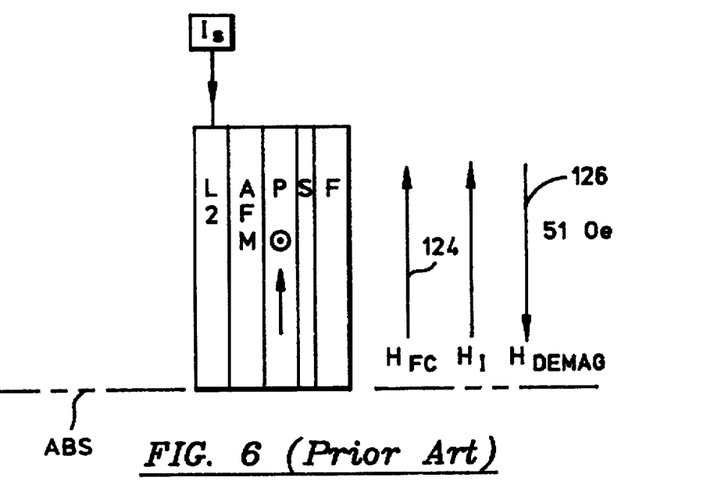
FIG. 6 is a view taken along plane VI—VI of FIG. 5.

Because of the thinness of the spacer layer 106 and roughness at the interfaces, there is a ferromagnetic coupling $H_{FC}$ which is induced on the free layer 102 by the pinned layer 104 as shown at 124 in FIG. 6. Another field acting on the free layer 102 upon conduction of the sense current, is a demagnetization field from the pinned layer 104 which causes an induced demagnetization field $H_{DEMAG}$, shown at 126, on the free layer. This is typically on the order of 51 Oe when the spin valve sensor is centered between the first and second shield layers 58 and 60 as shown in FIG. 4. By appropriately controlling the thicknesses of the layers 102, 104 and 106 and the amount of sense current $I_s$, the fields 124 and 126 can be made to substantially counterbalance one another so that the magnetic moment 111 of the free layer can be parallel to the ABS as shown in FIG. 5.

One of the problems with the prior art spin valve sensor 100 shown in FIGS. 5 and 6 is that the antiferromagnetic layer 108 has a blocking temperature between 160° C. to 200° C. During fabrication, testing and operation of the spin valve sensor in a magnetic disk drive, the blocking temperature of the antiferromagnetic layer 108 can be exceeded causing total destruction of the spin valve sensor by electrostatic discharge (ESD) or reduced efficiency by electrostatic overstress (EOS). Another problem with the antiferromagnetic layer 108 is that it shunts a portion of the sense current $I_s$ which reduces the efficiency of the spin valve sensor.

Figure 7:
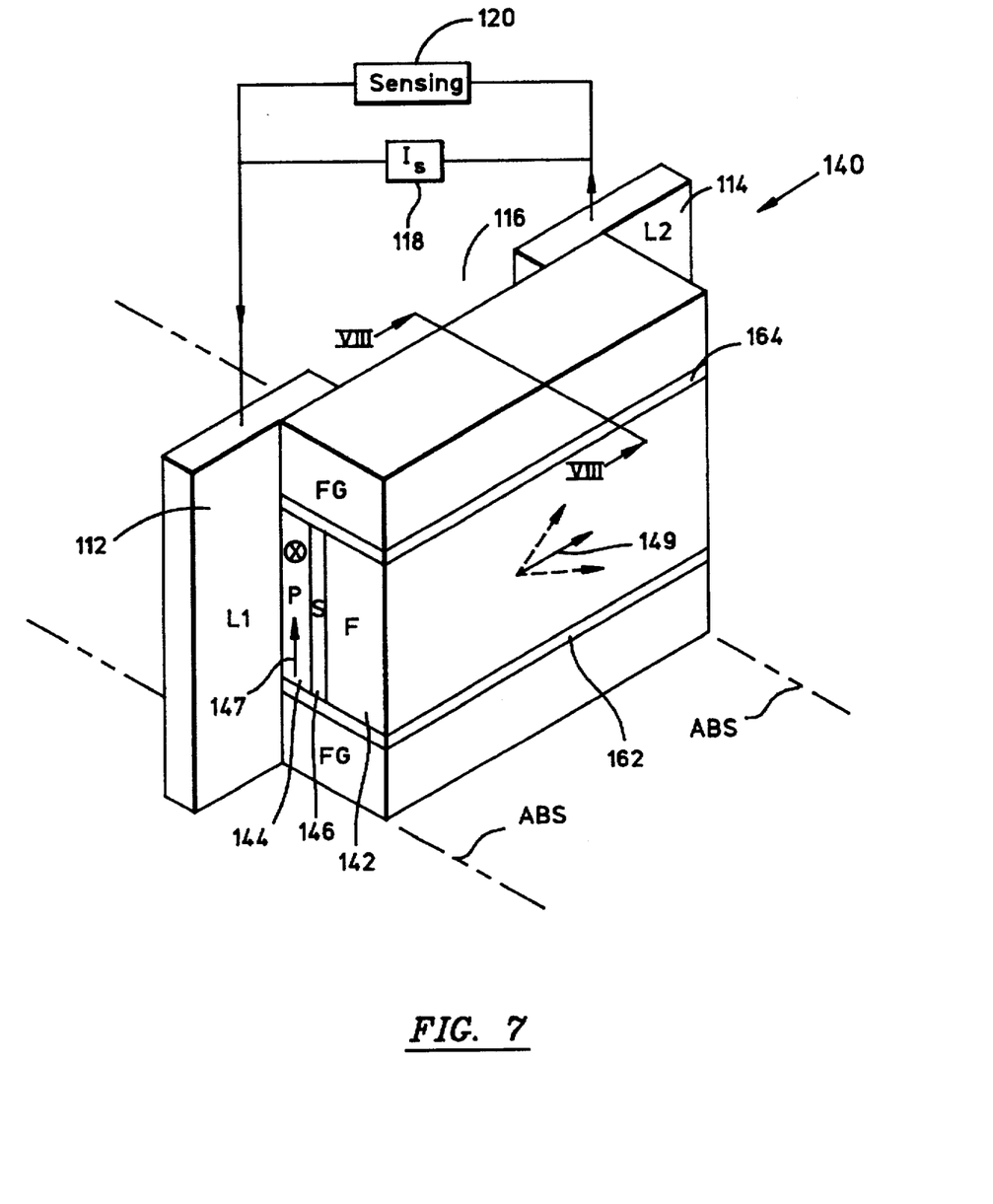
FIG. 7 is an isometric illustration of one embodiment of the present spin valve sensor.

A first embodiment of the present spin valve sensor 140 is shown in FIG. 7. This spin valve sensor, which is self biasing, does not employ an antiferromagnetic layer 108, as shown in FIG. 5. As will be explained more fully hereinafter, the magnetizations of the free and pinned layers are established by sense current fields from these layers due to the sense current $I_s$. The sensor 140 includes first and second ferromagnetic layers which are a free layer 142 and a pinned layer 144 respectively. A non-magnetic electrically-conducting spacer layer 146 is sandwiched between the free and pinned layers 142 and 144. The pinned layer 144 has a magnetization 147 which is pinned perpendicular to the ABS and the free layer 142 has a magnetization 149 which is directed parallel to the ABS and is free to rotate in either direction therefrom. The leads 112 and 114 are electrically connected to the sensor in the spaced relationship so as to provide the space 116 which defines the active region of the sensor and the track width of the read head employing the sensor.

Figure 8:
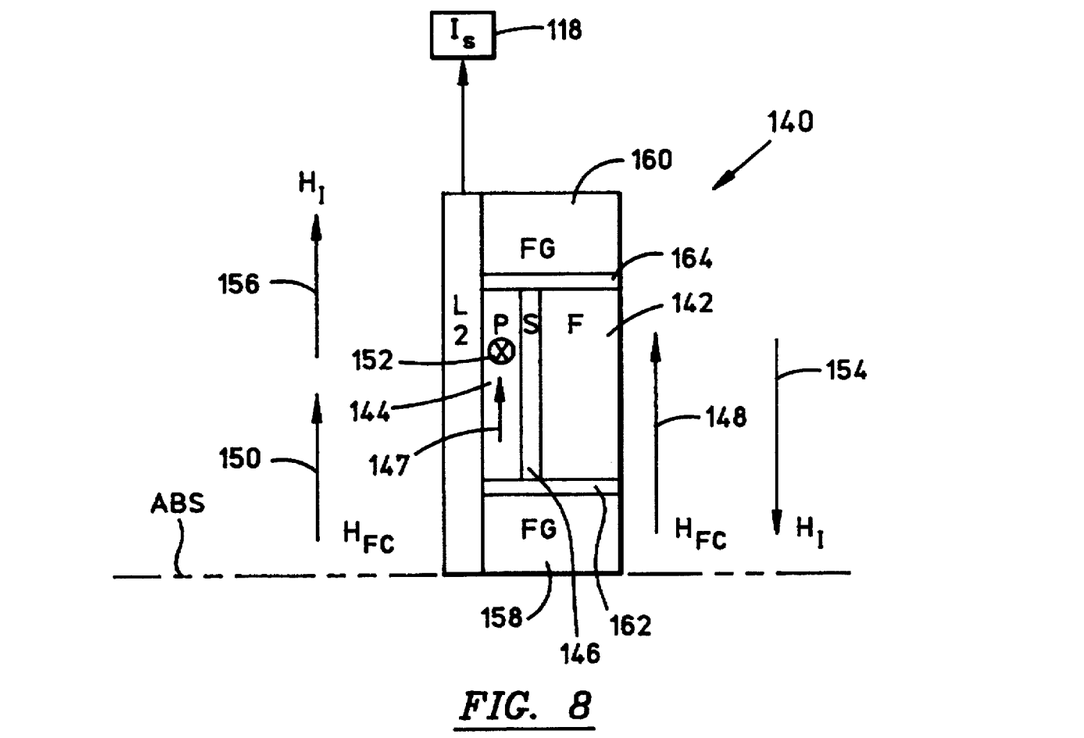
FIG. 8 is a view taken along plane VIII—VIII of FIG. 7.
Figure 9:
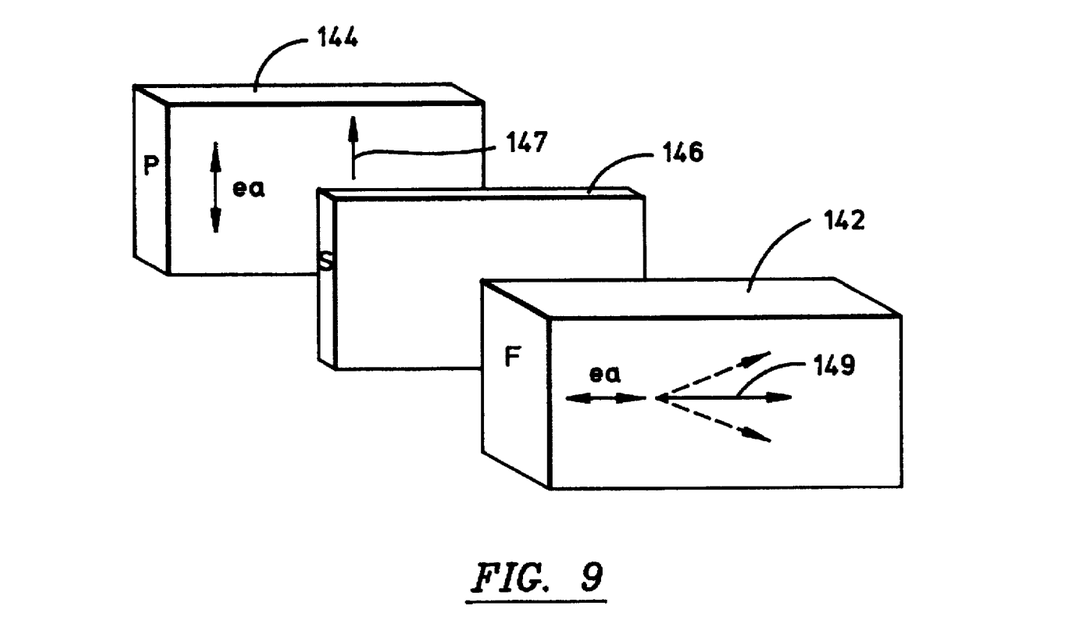
FIG. 9 is an exploded isometric illustration of the pinned layer, free layer and spacer layer of the spin valve sensor shown in FIG. 8 without the leads and flux guides.

As shown in FIG. 8 there are ferromagnetic coupling fields $H_{FC}$ 148 and 150 induced upon the free and pinned layers 142 and 144 by a mutual ferromagnetic coupling because of the thinness of the spacer layer 146 and roughnesses at the interfaces of the layers. The ferromagnetic coupling fields $H_{FC}$ are shown in an upward direction for each of the free and pinned layers 142 and 144. It should be understood that these ferromagnetic coupling fields would be in an opposite direction if the magnetic moment 147 of the pinned layer is in an opposite direction. The sense current $I_s$ can now be conducted in a selected direction through the sensor 140 which is shown into the paper by the back end of an arrow 152. A portion of the sense current is conducted into the paper through the pinned layer 144 which causes a sense current field 154 on the free layer 142 and a portion of the sense current is conducted into the paper through the free layer 142 which causes a sense current field 156 to be induced into the pinned layer 144. It should be noted that the sense current fields 154 and 156 are directed in opposite directions. The sense current field 156 will add to the ferromagnetic coupling field 150 so as to pin the magnetization 147 of the pinned layer 144 in an upwardly direction perpendicular to the ABS. The sense current field 154 induced into the free layer 142 is opposite to the ferromagnetic coupling field 148. The amount of sense current employed may substantially counterbalance the ferromagnetic coupling field 148 so that the magnetization 149 of the free layer is free to rotate upwardly and downwardly, as shown in FIG. 9, as influenced by field signals from the rotating disk.

The ferromagnetic coupling fields 148 and 150 are small fields on the order of 10 to 12 Oe. Likewise, the sense current fields 154 and 156 from the free and pinned layers 142 and 144 are small fields on the order of 10 to 12 Oe. It would be impractical to increase the sense current $I_s$ a sufficient mount to produce a sense current field for overcoming the demagnetization field $H_{DEMAG}$ 126 as shown in FIG. 6. The present invention substantially zeroes out the influence of the demagnetization field $H_{DEMAG}$ on the free layer 142 from the pinned layer 144 by providing first and second flux guides 158 and 160 which are connected to bottom and top edges of the layers 142, 146 and 144 along planes which are parallel to the ABS. The flux guides extinguish magnetic poles at the lower (ABS) and upper edges, thereby practically eliminating the pinned film demagnetizing field. Without the flux guides 158 and 160, the pinned layer 144 induces a demagnetization field $H_{DEMAG}$ on the order of 51 Oe in the free layer 142 in the same manner as shown in FIG. 6. The present invention will not operate without the flux guides 158 and 160 since a sense current field cannot be generated in a spin valve sensor of sufficient amount to overcome the demagnetization field $H_{DEMAG}$. In order to prevent shunting of the sense current, first and second insulation layers 162 and 164 are sandwiched between the flux guide 158 and the bottom edges of the layers and between the flux guide 164 and the top edges of the layers, as shown in FIG. 9. If the flux guides are constructed of a very high resistivity material, such as cobalt based materials, the insulation layers 162 and 164 can be omitted.

Figure 10:
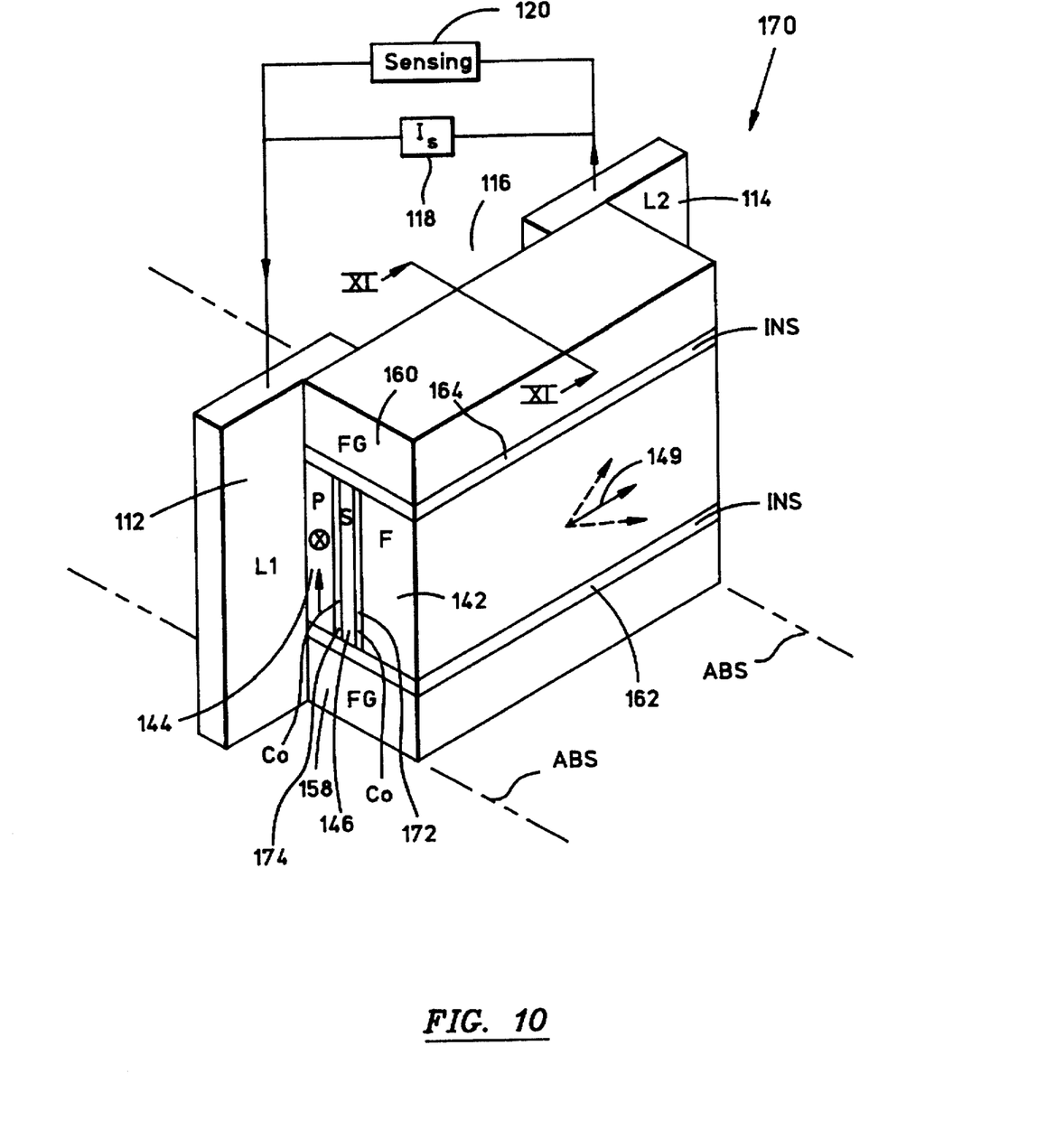
FIG. 10 is an isometric illustration of another embodiment of the present spin valve sensor.
Figures 12, 13:
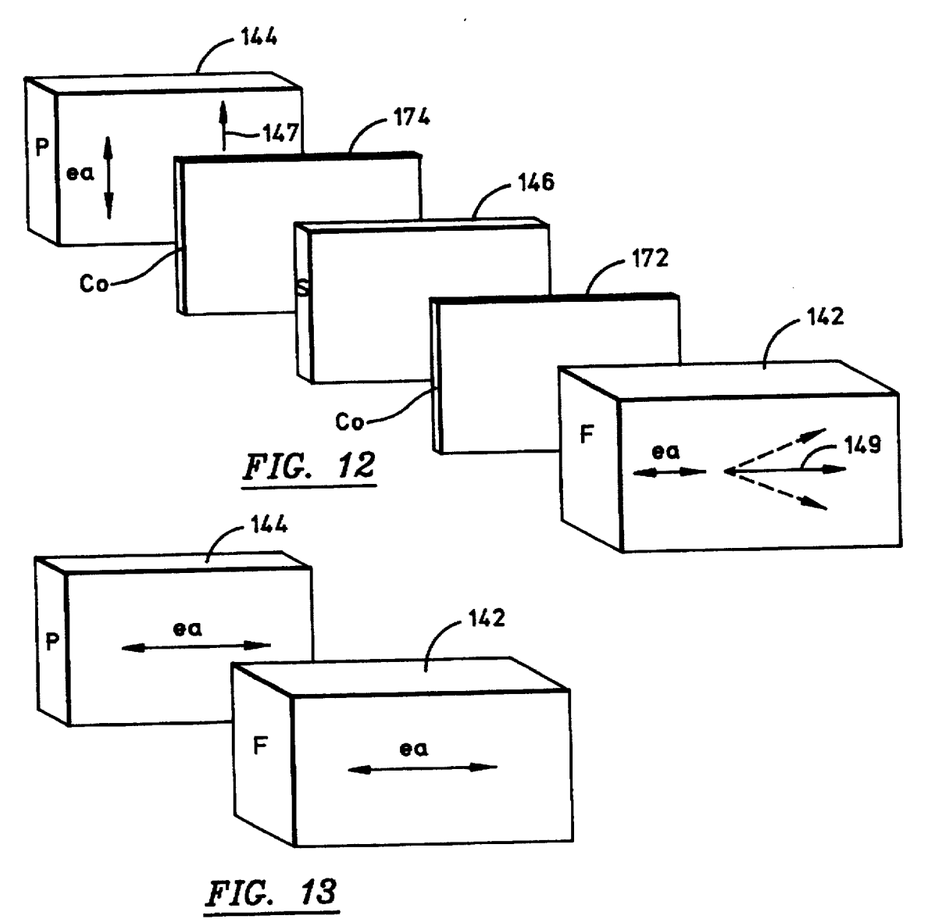
FIG. 12 is an isometric exploded illustration of the layers of the spin valve sensor shown in FIG. 11 without the leads and flux guides.
FIG. 13 is an exploded isometric illustration of the pinned and free layers of a spin valve sensor showing directions for the easy axes.

FIG. 10 shows another embodiment of the present spin valve sensor 170. The spin valve sensor 170 differs from the spin valve sensor 140 shown in FIG. 7, in that the spin valve sensor 170 has first and second cobalt layers 172 and 174. The cobalt layer 172 is sandwiched between the free layer 142 and the spacer layer 146, and the cobalt layer 174 is sandwiched between the pinned layer 144 and the spacer layer 146. The cobalt layers 172 and 174 are 5 Å to 10 Å thick and result in as much as a 50% increase in the MR coefficient of the spin valve sensor. In the same manner as the FIG. 8 embodiment, the sense current field 154 from the pinned layer 144 counter-balances the ferromagnetic coupling field 148 so that the magnetization 149 of the free layer is free to rotate upwardly and downwardly, as shown in FIG. 12, as influenced field signals from a rotating disk. Also, the sense current field 156 induced into the pinned layer 144 by the free layer 142 is additive to the ferromagnetic coupling field 150 so as to pin the magnetization 147 of the pinned layer in the upward direction as shown in FIG. 12. It should be understood that the direction of the magnetizations will be reversed in all of these embodiments when the direction of the sense current is reversed. The invention encompasses the sense current being conducted in either direction through the spin valve sensor.

Figure 11:
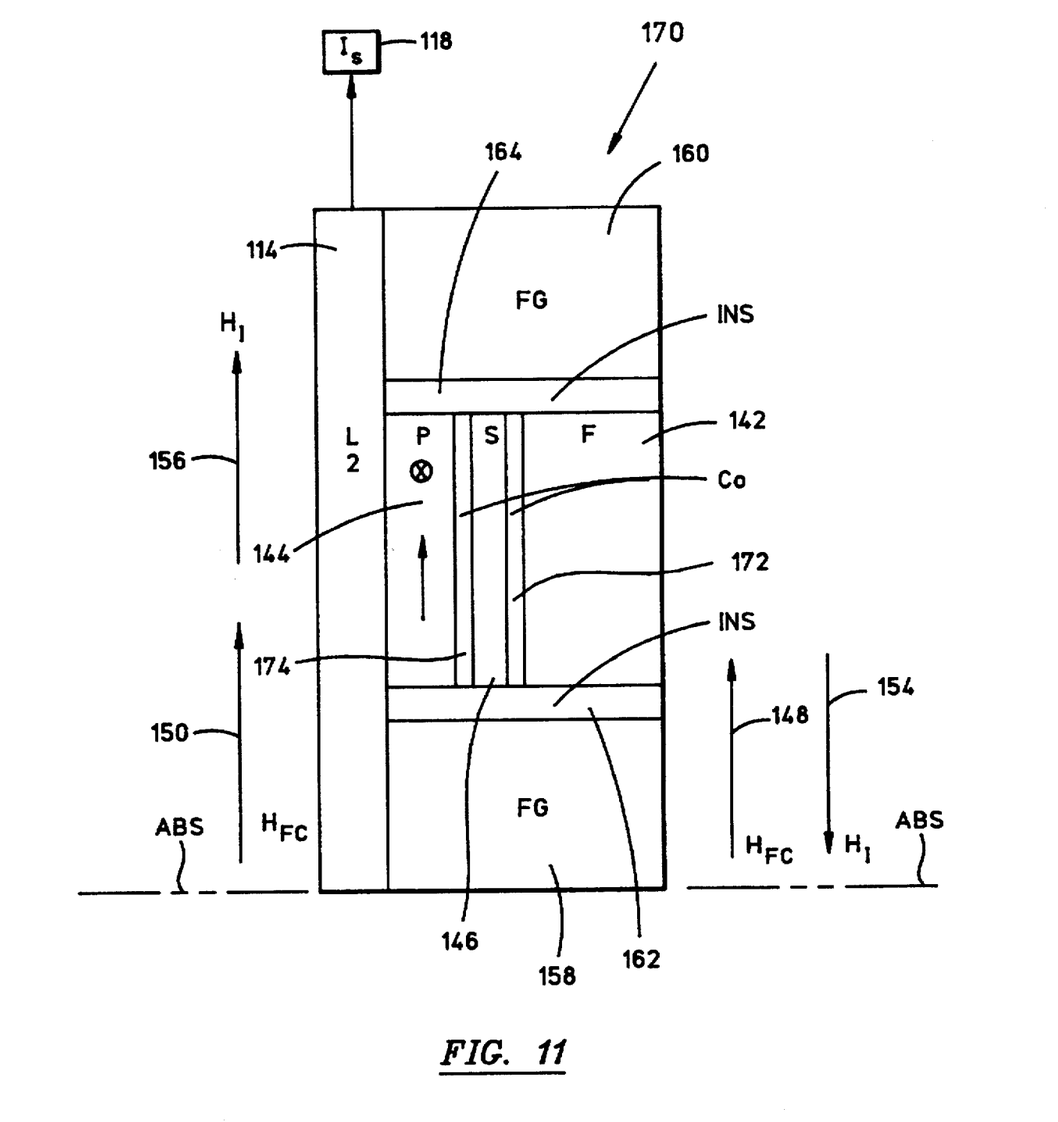
FIG. 11 is a view taken along plane XI—XI of FIG. 10.
Figure 15:
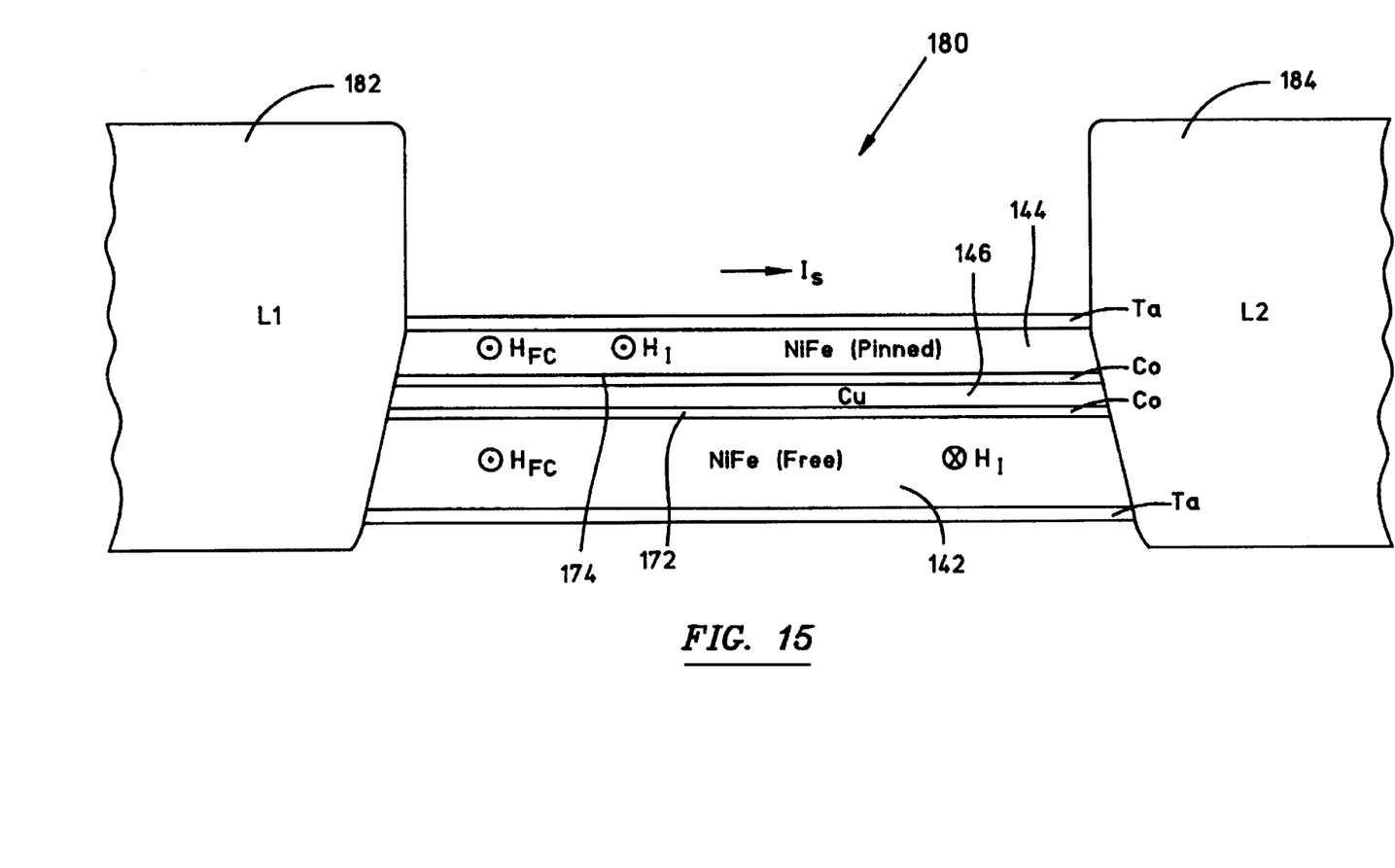
FIG. 15 is a lateral cross-section through the MR sensor of FIGS. 10 and 11 looking toward the ABS with a different arrangement for the connection of the leads.
Figure 16:
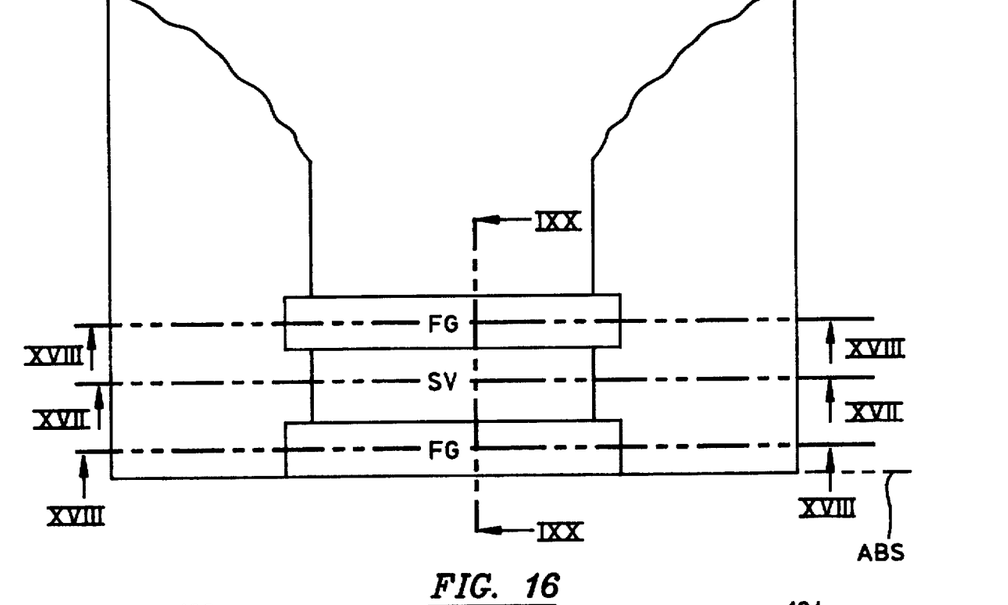
FIG. 16 is a schematic top view of either embodiment of the present invention.

A modified embodiment 180 of the embodiment 170, shown in FIGS. 15 and 16, is a lateral cross-section through the spin valve sensor in FIGS. 10 and 11 looking toward the ABS. The embodiment 180 has first and second leads 182 and 184 which are connected to two vertically oriented side edges of the layers 142, 144, 146, 172 and 174. This type of connection is called a contiguous junction.

EXAMPLE

An example of the spin valve sensor 140, shown in FIGS. 7 and 8, includes the thickness of the free layer 142 being twice as thick as the thickness of the pinned layer 144. The free layer 142 may be 100 Å thick, the pinned layer 146 may be 50 Å thick and the spacer layer 146 may be 25 Å thick. The sense current $I_s$ conducted through the spin valve sensor 140 may be 6 mA. The height of the layers 142, 144 and 146 between the insulation layers 162 and 164 may be 1 μm. With this arrangement, the ferromagnetic coupling fields 148 and 150 may each be on the order of 12 Oe. The sense current fields 154 and 156 will be on the order of 10 to 12 Oe. Accordingly, the ferromagnetic coupling field 150 and the sense current field 156 will be additive to orient the magnetization 147 in the pinned layer 144 with a strength of approximately 24 Oe. Since the ferromagnetic coupling field 148 and the sense current field 154 are substantially equal, they will counterbalance one another so that the magnetization 149 of the free layer is free to rotate upwardly or downwardly, as shown in FIG. 7. The sense current field $H_I$ induced into a layer is according to the formula $H_I = 2 \pi I_s \div \text{height}$, where $I_s$ is the portion of the sense current conducted through the inducing layer in milliamps and the height of the inducing layer is in microns. This formula assumes that the spin valve sensor is centered between the first and second shields 58 and 60 shown in FIG. 4. It is important that the bottom flux guides 158 at the ABS have a short height, in the order of 0.5 μm, so that field signals from the rotating disk do not decay to the first and second shield layers before they get to the layers 142, 146 and 144.

Figure 14:
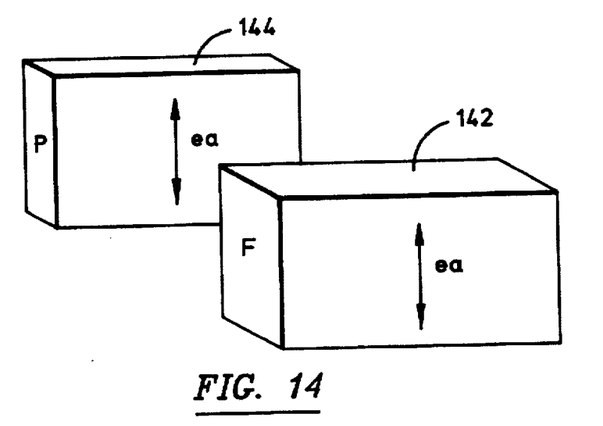
FIG. 14 is an exploded isometric illustration of the pinned and free layers of the spin valve sensor showing directions for the easy axes.

In some embodiments it may be desirable to orient the easy axes of both of the free and pinned layers 142 and 144 in a direction which is parallel to the ABS as shown in FIG. 13. Also, in some embodiments it may be desirable to establish the easy axes of the free and pinned layers 142 and 144 in a direction which is perpendicular to the ABS as shown in FIG. 14. In both of the embodiments in FIGS. 13 and 14 the fabrication process would be simpler since the easy axes of both layers can be established simultaneously. The material for the free and pinned layers 142 and 144 is Permalloy based and the material for the spacer layer 146 may be copper.

Figure 17:
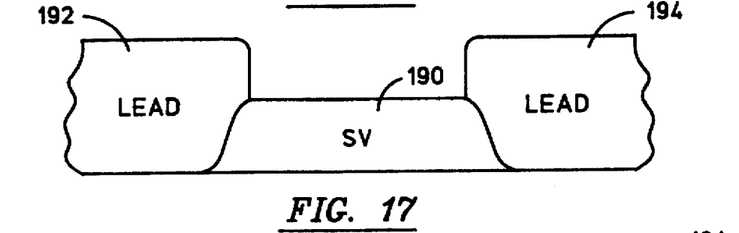
FIG. 17 is a view taken along plane XVII—XVII of FIG. 16.
Figure 18:
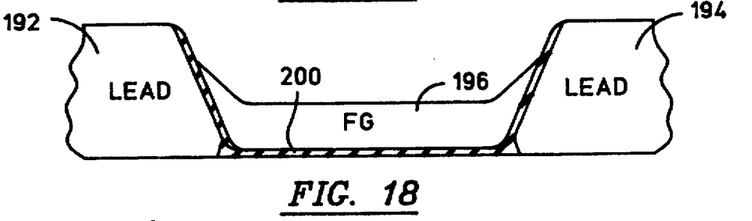
FIG. 18 is a view taken along either plane XVIII—XVIII of FIG. 16.
Figure 19:
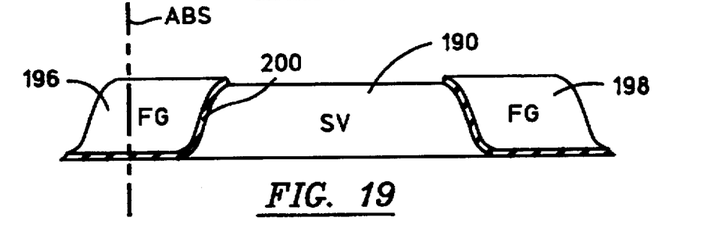
FIG. 19 is a view taken along plane XIX—XIX of FIG. 16.

FIGS. 16–19 show various views for explaining the steps in the manufacture of either embodiment of the present invention. The first step is to deposit spin valve material 190 in sheet form on a wafer (not shown) wherein the sheet material may comprise Ta/NiFe/Co/Cu/Co/NiFe/Ta. With a photographic lift-off process (not shown) the areas where the leads 192 and 194 are to be deposited may be ion milled away so that lead material can be deposited therein. This forms a contiguous junction with the spin valve 190 as shown in FIG. 17. Again with a photographic lift-off process the areas where the flux guides 196 and 198 are to be deposited are milled away, and an insulation layer 200 and the flux guides 196 and 198 are then deposited. In the area where the leads 192 and 194 are located the insulation layer 200 insulates the leads 192 and 194 from the flux guide 196.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A self-biasing magnetoresistive (MR) spin valve sensor for use in a magnetic head having an air bearing surface (ABS), comprising:

first and second ferromagnetic layers and a non-magnetic conductive spacer layer, each of the first and second ferromagnetic layers and the spacer layer having first and second edges which are substantially parallel to said ABS and third and fourth edges which are substantially perpendicular to the ABS;

the spacer layer being sandwiched between the first and second ferromagnetic layers;

first and second leads electrically connected to the third and fourth edges respectively of the first and second ferromagnetic layers and the spacer layer for conducting a sense current therethrough;

the first and second ferromagnetic layers being magnetically coupled so that a ferromagnetic coupling field ($H_{FC}$) is produced in each of the first and second ferromagnetic layers;

the second ferromagnetic layer having a stray demagnetization field $H_{DEMAG}$ which is induced into the first ferromagnetic layer;

first and second flux guides; and the first flux guide being magnetically coupled to the first edges of the layers and the second flux guide being magnetically coupled to the second edges of the layers for reducing the induced stray demagnetization field $H_{DEMAG}$ in the first ferromagnetic layer to such an extent that when the sense current is conducted a sense current field from the first ferromagnetic layer will supplement the ferromagnetic coupling field in the second ferromagnetic layer to pin its magnetization and a sense current field from the second ferromagnetic layer will oppose the ferromagnetic coupling in the first ferromagnetic layer to permit a magnetization of the first ferromagnetic layer to be free to rotate under the influence of an applied field.

2. An MR read head including the MR sensor of claim 1 wherein the read head comprises:

first and second gap layers:

the MR sensor being sandwiched between the first and second gap layers;

first and second shield layers; and the first and second gap layers being sandwiched between the first and second shield layers.

3. A combined MR read head and inductive write head including the MR read head of claim 2, the combined head comprising:

an inductive coil embedded in an insulation stack;

the insulation stack and the inductive coil being sandwiched between first and second pole pieces; and the first and second pole pieces being spaced by a third gap layer at an air bearing surface.

4. A magnetic disk drive including the combined head as claimed in claim 3, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

5. A sensor as claimed in claim 1 including:

sense current means connected to the first and second leads for conducting a sense current through the first and second ferromagnetic layers and the spacer layer in a selected direction; and said selected direction causing the sense current to induce a sense current field $H_I$ that subtracts from the ferromagnetic coupling field $H_{FC}$ in the first ferromagnetic layer and to induce a sense current field $H_I$ that adds to the ferromagnetic coupling field $H_{FC}$ in the second ferromagnetic layer.

6. A sensor as claimed in claim 1 including:

the magnetic coupling of the first and second flux guides to the first and second edges of the first and second ferromagnetic layers reducing the field induced into the first ferromagnetic layer from the stray demagnetization field $H_{DEMAG}$ of the second ferromagnetic layer substantially to zero.

7. A sensor as claimed in claim 1 including:

first and second cobalt layers;

the first cobalt layer being sandwiched between the first ferromagnetic layer and the spacer layer and the second cobalt layer being sandwiched between the second ferromagnetic layer and the spacer layer.

8. A sensor as claimed in claim 1 including:

each of the first and second ferromagnetic layers having a thickness between its first and second film surfaces; and the thickness of the first ferromagnetic layer being thicker than the thickness of the second ferromagnetic layer.

9. A sensor as claimed in claim 8 including:

the thickness of the first ferromagnetic layer being substantially twice the thickness of the second ferromagnetic layer.

10. A sensor as claimed in claim 1 including:

each of the first and second ferromagnetic layers having an easy axis; and the easy axis of the first ferromagnetic layer being directed substantially parallel to the ABS and the easy axis of the second ferromagnetic layer being directed substantially perpendicular to the ABS.

11. A sensor as claimed in claim 1 including:

first and second insulation layers;

the first insulation layer being sandwiched between the first flux guide and the first edge of the first ferromagnetic layer and the second insulation layer being sandwiched between the second flux guide and the second edge of the first ferromagnetic layer.

12. A sensor as claimed in claim 11 including:

first and second cobalt layers;

the first cobalt layer being sandwiched between the first ferromagnetic layer and the spacer layer and the second cobalt layer being sandwiched between the second ferromagnetic layer and the spacer layer.

13. A sensor as claimed in claim 12 including:

the thickness of the first ferromagnetic layer being substantially 100 Å, the thickness of the second ferromagnetic layer being substantially 50 Å and the thickness of the spacer layer being substantially 25 Å; and the sense current being substantially 6 mA.

14. A sensor as claimed in claim 13 including:

the first flux guide having a height between the ABS and the first edge of the first ferromagnetic layer of substantially 0.5 um.

15. A sensor as claimed in claim 1 including:

sense current means connected to the first and second leads for conducting a sense current through the first and second ferromagnetic layers and the spacer layer, the sense current through the first ferromagnetic layer inducing a sense current field $H_I$ on the second ferromagnetic layer in said first direction so that the ferromagnetic coupling field $H_{FC}$ and the sense current field $H_I$ in the second ferromagnetic layer are additive and the sense current through the second ferromagnetic layer inducing a sense current field $H_I$ on the first ferromagnetic layer opposite and antiparallel to said first direction so that the ferromagnetic coupling field $H_{FC}$ and the sense current field $H_I$ in the first ferromagnetic layer are subtractive.

16. A sensor as claimed in claim 15 including:

the magnetic coupling of the first and second flux guides to the first and second edges of the first and second ferromagnetic layers reducing the field induced into the first ferromagnetic layer from the stray demagnetization field $H_{DEMAG}$ of the second ferromagnetic layer substantially to zero.

17. A sensor as claimed in claim 16 including:

first and second cobalt layers;

the first cobalt layer being sandwiched between the first ferromagnetic layer and the spacer layer and the second cobalt layer being sandwiched between the second ferromagnetic layer and the spacer layer.

18. A sensor as claimed in claim 17 including:

each of the first and second ferromagnetic layers having a thickness; and the thickness of the first ferromagnetic layer being thicker than the thickness of the second ferromagnetic layer.

19. A sensor as claimed in claim 18 including:

each of the first and second ferromagnetic layers having an easy axis; and the easy axis of the first ferromagnetic layer being directed substantially parallel to the ABS and the easy axis of the second ferromagnetic layer being directed substantially perpendicular to the ABS.

20. A sensor as claimed in claim 19 including:

first and second insulation layers;

the first insulation layer being sandwiched between the first flux guide and the first edge of the first ferromagnetic layer and the second insulation layer being sandwiched between the second flux guide and the second edge of the first ferromagnetic layer.

21. A sensor as claimed in claim 20 including:

the thickness of the first ferromagnetic layer being substantially twice the thickness of the second ferromagnetic layer.

22. A sensor as claimed in claim 21 including:

each of the first and second ferromagnetic layers including NiFe and the spacer layer including copper;

the thickness of the first ferromagnetic layer being substantially 100 Å, the thickness of the second ferromagnetic layer being substantially 50 Å and the thickness of the spacer layer being substantially 25 Å; and the sense current being substantially 6 mA.

23. An MR read head including the MR sensor of claim 22 wherein the read head comprises:

first and second gap layers:

the MR sensor being sandwiched between the first and second gap layers;

first and second shield layers; and the first and second gap layers being sandwiched between the first and second shield layers.

24. A combined MR read head and inductive write head including the MR read head of claim 23, the combined head comprising:

an inductive coil embedded in an insulation stack;

the insulation stack and the inductive coil being sandwiched between first and second pole pieces; and the first and second pole pieces being spaced by a third gap layer at an air bearing surface.

25. A magnetic disk drive including the combined head as claimed in claim 24, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

* * * * *